(12) United States Patent
Dreher et al.

(10) Patent No.: US 7,169,471 B1
(45) Date of Patent: Jan. 30, 2007

(54) LASER-MARKING ADDITIVE

(75) Inventors: Shane F. Dreher, Hawthorne, NY (US);
Mark J. Tellefsen, Savannah, GA (US);
Tammy E. Link, Savannah, GA (US)

(73) Assignee: EMD Chemicals, Inc., Gibbstown, NJ (US)

( * ) Notice: Subject to any disclaimer, the term of this patent is extended or adjusted under 35 U.S.C. 154(b) by 106 days.

(21) Appl. No.: 10/845,594

(22) Filed: May 14, 2004

Related U.S. Application Data

(63) Continuation of application No. 10/772,411, filed on Feb. 6, 2004, now abandoned.

(60) Provisional application No. 60/445,231, filed on Feb. 6, 2003.

(51) Int. Cl.
*B32B 5/16* (2006.01)

(52) U.S. Cl. ............... 428/402; 428/403; 428/407; 523/216

(58) Field of Classification Search ............ 428/402, 428/403, 407
See application file for complete search history.

(56) References Cited

U.S. PATENT DOCUMENTS

| | | | |
|---|---|---|---|
| 4,816,374 A | 3/1989 | Lecomte | |
| 5,075,195 A * | 12/1991 | Babler et al. ............... | 430/200 |
| 5,091,284 A | 2/1992 | Bradfield | |
| 5,149,369 A | 9/1992 | Eberts et al. | |
| 5,373,039 A * | 12/1994 | Sakai et al. ............... | 524/100 |
| 5,560,845 A | 10/1996 | Birmingham, Jr. et al. | |
| 5,667,580 A | 9/1997 | Bäbler | |
| 5,789,466 A | 8/1998 | Birmingham, Jr. et al. | |
| 5,866,644 A * | 2/1999 | Mercx et al. ............... | 524/417 |
| 6,019,831 A * | 2/2000 | Schmidt et al. ............... | 106/417 |
| 6,162,374 A | 12/2000 | Schoen et al. | |
| 6,214,916 B1 * | 4/2001 | Mercx et al. ............... | 524/404 |
| 6,214,917 B1 | 4/2001 | Linzmeier et al. | |
| 6,291,551 B1 * | 9/2001 | Kniess et al. ............... | 523/216 |
| 6,482,879 B2 * | 11/2002 | Hieltjes et al. ............... | 524/398 |
| 6,596,070 B1 * | 7/2003 | Schmidt et al. ............... | 106/417 |
| 6,673,423 B2 * | 1/2004 | Kranenburg-Van Dijk et al. ............... | 428/203 |
| 6,693,657 B2 * | 2/2004 | Carroll et al. ............... | 347/224 |
| 6,719,453 B2 * | 4/2004 | Cosman et al. ............... | 366/141 |
| 6,825,265 B2 * | 11/2004 | Daga et al. ............... | 524/544 |
| 2002/0068773 A1 | 6/2002 | Solms et al. | |
| 2002/0122931 A1 | 9/2002 | Brownfield et al. | |
| 2002/0171732 A1 | 11/2002 | Carroll, Jr. et al. | |

FOREIGN PATENT DOCUMENTS

| | | |
|---|---|---|
| DE | 4305280 A1 | 8/1994 |
| DE | 4415802 | 11/1995 |
| EP | 0702063 A2 | 3/1996 |
| EP | 1190988 A2 | 3/2002 |
| WO | WO 98/03583 | 1/1998 |
| WO | WO 98/35096 A1 | 8/1998 |
| WO | WO 98/53011 | 11/1998 |
| WO | WO 00/78554 | 12/2000 |
| WO | WO 02/083567 A2 | 10/2002 |
| WO | WO 02/083567 A3 | 10/2002 |

OTHER PUBLICATIONS

Mearlite® industrial grade pearlescent pigments, Engelhard, (no later than Jan. 2003).
Acquarulo, Larry, Specialty Compounds for Medical Applications: An Introduction, Medical Devicelink Website, Sep. 1996, print outs [2 copies].
Emmert, Ralf, Instrumentation Color Matching of Pearlescent Pigments, *Cosmetics and Toiletries*, 104(7), 57, Jul. 1989.
Material Safety Data Sheet, Experimental Bi-Flare® 81 Pigment, Bismuth Oxychloride (Feb. 2002).
TW-0542764B—Abstract Only, corresponds to U.S. Patent No. 6,693,657 (cite No. AA).
Carroll, James B., et al., Additive for YAG Laser Marking, Abstract of EP 1377522A2 (Nov. 2002).

\* cited by examiner

*Primary Examiner*—Leszek Kiliman

(57) ABSTRACT

The present invention relates to a laser marking additive, a precursor and method of laser-marking. The method can include exposing a substrate including a high luster bismuth oxychloride to a laser creating a laser-mark, with the proviso that the substrate is not an unsaturated polyester cross-linked with a styrene monomer.

35 Claims, 2 Drawing Sheets

LASER-MARKING ADDITIVE

CROSS-REFERENCE TO RELATED APPLICATIONS

This application, and is a continuation application of U.S. application Ser. No. 10/772,411, filed Feb. 6, 2004, now abandoned which claims the benefit of U.S. Provisional Application No. 60/445,231 filed Feb. 6, 2003.

The present invention generally relates to a laser-marking additive, a laser-marking precursor including the additive, a laser-marked article made from the precursor, a product including the laser-marked article, or a method and/or a process relating to the same.

Laser beam irradiation can initiate a chemical change producing a permanent visible mark in a substrate. These substrates can include an organic resin or a matrix, such as a thermoset or thermoplastic article, a coating on a substrate, or a fibrous sheet such as paper or cardboard. Such marks are used to create lettering, numbering, codes such as bar codes, and designs. Generally, laser-marks provide a higher degree of permanence and durability compared to printed ink marks, such as screen printed or laser jet marks applied directly onto the surface of the substrate or by, for example, adhesive labels, to an article. A laser-mark can provide irreversible chemical changes incorporated or encapsulated directly into a substrate, unlike a printed mark that can fail due to chemical or physical degradation of adhesive or the binder components.

Laser-marked articles can be used in many of the same fields, such as electrical, electronic or motor vehicle industries, as printed articles. As an example, the labeling and inscription of, for example, cables, wires, trend strips, or functional parts in the heating, ventilation and cooling sectors of switches, plugs, levers or handles, are even possible at poorly accessible points with the aid of a laser. What is more, nontoxic laser-marked articles can be safely employed in packaging for foodstuffs or toys. These markings on packaging can be wipe- and scratch-resistant, stable during subsequent sterilization processes, and applied in a hygienically pure manner during the marking process. Complete label motifs can be applied durably to the packaging for a reusable system. Furthermore, laser-marking can be used for plastic tags, such as cattle tags or ear-mark tags. Combined with a bar code system, the information specific to the animal can be stored and recalled with the aid of a scanner. Durability of the mark on the tag is very important because the tag can remain on the animal for several years.

The laser-marking for articles can take two forms. The first form involves the forming of localized encapsulated foams during exposure to a laser, which lighten a colored or dark resin. A second form exposes to a laser light a localized area that may induce formation of a carbonaceous char residue that converts the localized area to a much darker or virtually black color compared to the unexposed surrounding regions.

Resin without additives, or filled or pigmented substrates often are not intrinsically very sensitive to laser beam exposure. Consequently, marking these materials may require prolonged exposure and/or high energy density. These requirements make the process more expensive and less commercially attractive. Furthermore, although a high energy exposure may create a mark with sufficient contrast, often the definition of the mark becomes distorted or irregular rendering the mark commercially less effective or even completely useless. To enhance the laser-marking process, often an agent is incorporated within the substrate to produce a well-defined mark under less aggressive exposure conditions that are commercially practical for automation and high throughput.

Although these additives can be incorporated into a resin to enhance the quality of the obtained laser-mark, it is desirable to provide an additive with the highest sensitivity and thereby allow the amount of additive to be minimized. The objective is to avoid disturbing the properties and the appearance (color and texture) of the substrate. What is more, it is desirable to use an additive that is non-toxic and safe for use in variety applications, such as food packaging. Consequently, there is a desire to provide an additive for laser-marking that can be used in relatively low amounts and is non-toxic, and thus, suitable for uses in such industries as food or toy packaging.

As an example, high luster bismuth oxychloride has been dispersed in unsaturated polyester thermosetting resin intended for button casting, namely a polyester resin cross-linked with a styrene monomer. As such, the thermosetting resin is a mixture of a polyester resin and styrene monomer that undergoes additional polymerization and cross-linking via addition reactions catalyzed by peroxide and by metal salts of organic anions and known to be laser markable, besides exhibiting unsurpassed luster brilliance. At that time, however, it was unexpected that high luster bismuth oxychloride would exhibit commercially viable sensitivity in extruded thermoplastics, especially polyolefins. Particularly, additives vary in their laser marking sensitivity depending, e.g., on the thermoplastic chosen to be the precursor substrate. Thus, it was not apparent that high luster bismuth oxychloride would be a suitable laser marking additive when combined with other extruded thermoplastics, particularly polyolefins.

One exemplary embodiment of the present invention provides a laser marking additive, including a plurality of particles having a thickness less than 100 nm and all dimensions less than 25 microns of at least one compound of the formula: where M is, independently, As, Sb, or Bi; or a compound of the formula $BiONO_3$, $Bi_2O_2CO_3$, $BiOOH$, $BiOF$, $BiOBr$, $BiOC_3H_5O_7$, $Bi(C_7H_5O_2)_3$, $BiPO_4$, $Bi_2(SO_4)_3$, $Pb(OH)_2.2PbCO_3$, or $Pb(OH)_2.PbCO_3$; wherein a lacquer drawdown comprising the additive has a luster index of greater than 50%. Preferably, the particles have all dimensions less than 5 microns or the additive is a high luster bismuth oxychloride. Preferably, the high luster bismuth oxychloride includes platelets having a thickness of no more than 90 nm, even more preferably a thickness of no more than 70 nm, and optimally a thickness of about 60 nm.

What is more, the laser marking additive can further include a fatty amine, a fatty amide, an organic cationic surfactant, an organic ionic surfactant; an organic nonionic surfactant; an organic silane; an organic siloxane; or an organic polymer, or preferably can further include an ethoxylated fatty amine or amide, an ethoxylated fatty alkyl quaternary amine, an ethoxylated di-fatty alkyl quaternary amine, a sodium stearate, an ethoxylated sorbitol ester of a fatty acid, a fatty alcohol quaternary amine, or a mineral oil. Even more preferably, the laser marking additive is an ethoxylated fatty amine of the formula:

where:

$R^1$ includes any fatty acid hydrocarbon from 8–22 C atoms, and $R^2$ and $R^3$ are, independently, 1–25 units of —$CH_2CH_2O$— where the last unit terminates in a hydrogen atom;

an ethoxylated fatty amide of the formula:

$$R^1CONR^2R^3$$

where:

$R^1$ includes any fatty acid hydrocarbon from 8–22 C atoms, and $R^2$ and $R^3$ are, independently, 1–25 units of —$CH_2CH_2O$— where the last unit terminates in a hydrogen atom; or can further include a non-ethoxylated quaternary chloride salt of the formula:

$$R^1NR^3{}_3{}^+Cl^-$$

where:

$R^1$ includes any fatty acid hydrocarbon from 8–22 C atoms, and $R^4$ is, independently, methyl, ethyl or propyl.

Another exemplary embodiment of the present invention provides a laser-markable precursor that includes a substrate of a polyolefin, a polyamide, a polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, an acrylonitrile-styrene-acrylate, a polycarbonate, a polyether sulphone, a polyether ketone, a copolymer thereof, or a mixture thereof, with the proviso that the substrate is not an unsaturated polyester cross-linked with a styrene monomer, and a laser marking additive as described above.

Alternatively, exemplary embodiment of the present invention provides a laser-markable precursor including a substrate of a polyolefin, a polyamide, a saturated polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, an acrylonitrile-styrene-acrylate, a polycarbonate, a polyether sulphone, a polyether ketone, a copolymer thereof, or a mixture thereof, and a laser marking additive as described above.

A still further exemplary embodiment of the present invention provides a laser-markable precursor, comprising a substrate of a polyolefin, a polyamide, a polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, an acrylonitrile-styrene-acrylate, a polycarbonate, a polyether sulphone, a polyether ketone, a copolymer thereof, or a mixture thereof, with the proviso that the substrate is not an unsaturated polyester cross-linked with a styrene monomer, and a high luster bismuth oxychloride.

Yet another exemplary embodiment of the present invention provides a laser-markable precursor, comprising a substrate of a polyolefin, a polyamide, a saturated polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, an acrylonitrile-styrene-acrylate, a polycarbonate, a polyether sulphone, a polyether ketone, a copolymer thereof, or a mixture thereof, and a high luster bismuth oxychloride.

Preferably, the substrate is a polyethylene or polypropylene, or optimally the substrate is a high density polyethylene. Generally, the loading of the bismuth oxychloride in the substrate is less than 5%, preferably less than 0.3%, and optimally 0.1–0.25%.

Still yet another exemplary embodiment of the present invention provides a method of laser-marking including exposing a precursor, as discussed above, to a laser creating a laser-mark. Preferably, the laser is a pulsed laser, a gas laser, or an excimer laser, and optimally a Nd:YAG laser.

Generally, the present invention provides a white, non-toxic inorganic additive, which can be incorporated into a thermoplastic, preferably a polyolefin. Desirably, the loading levels of the additive are as low as 0.1%, by weight. An exemplary high luster BiOCl additive is generally 4–10 times more sensitive than non-high luster BiOCl, i.e. the high luster BiOCl can be used in amounts of 1%–10%, by weight of the amount of non-high luster BiOCl needed for obtaining a comparable laser-mark. In addition, the high luster BiOCl provides a better defined laser-mark as compared to non-high luster BiOCl. What is more, the white additive is nontoxic so it can be used in applications such as foodstuff and toy packaging.

Figure 1:
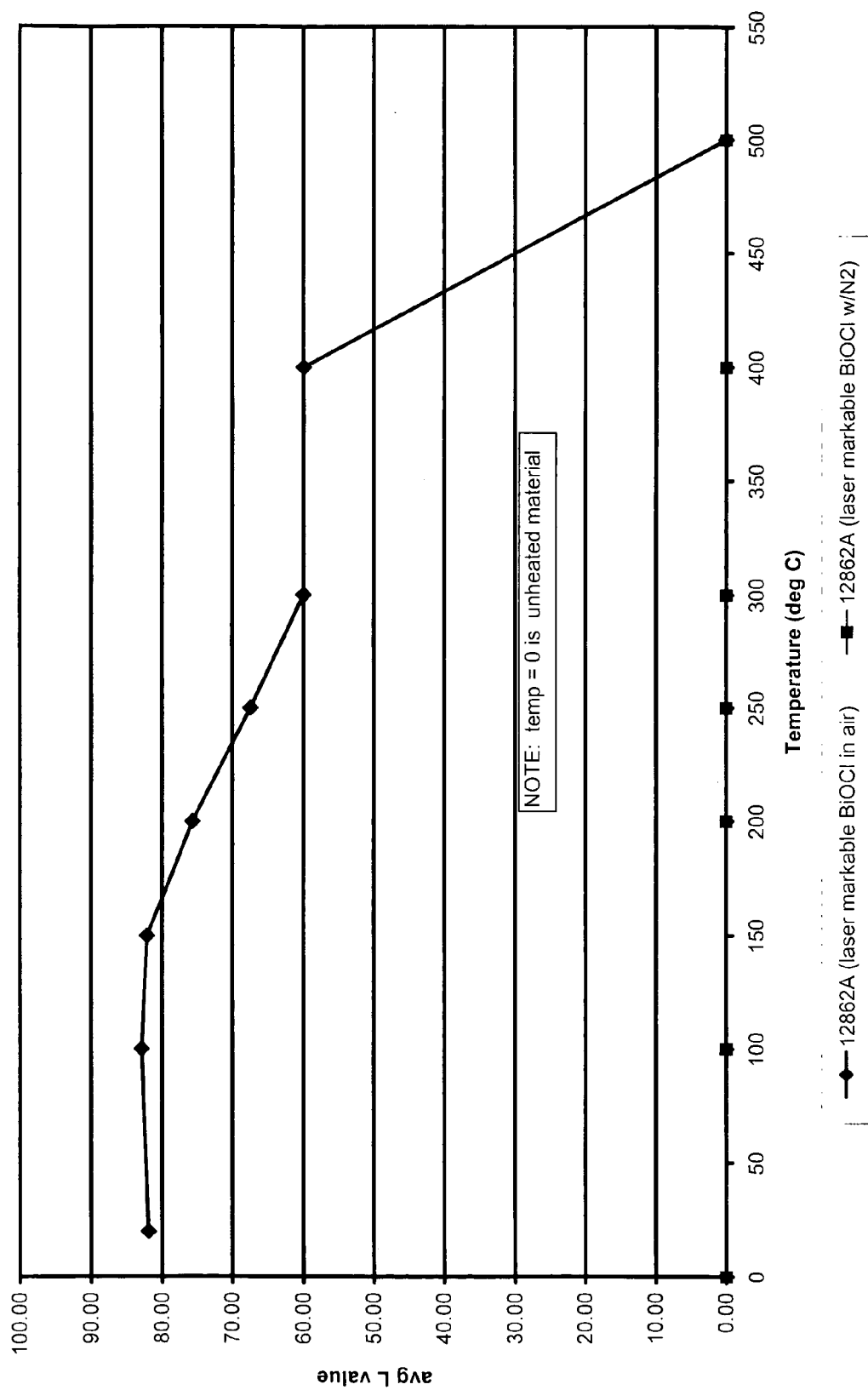
FIG. 1 is a graphical depiction of a high luster BiOCl additive and a comparison non-high luster BiOCl additive plotting 'L' value versus temperature in degree Celsius.

As used herein, "luster" means the brightness of a material when oriented into a plane (preferably dispersed in a lacquer film over a black carrier substrate) and when observed at nearly a specular combination of incident and observed angles in comparison to the brightness observed away from the specular angle and can be quantified as a luster index. To determine whether a suitable state of dispersion exists for a high luster determination, a liquid suspension in lacquer or other fluid is examined microscopically. The nearly complete absence of any agglomerates (platelets that are stuck together with face-to-face overlap) indicates a suitable state of dispersion. Particularly, for a suitable dispersion state, about 5% or less of the platelets are present as agglomerates. Alternatively, a drawdown film can be prepared at low loading levels of, e.g., high luster bismuth oxychloride, and be examined under an incident light optical microscope. A drawdown film is prepared by diluting a high luster dispersion into a letdown lacquer. A suitable letdown lacquer is about 14% RS (nitrocellulose grade) 5-6 sec (viscosity grade) of nitrocellulose in butyl acetate. The weight percent of high luster BiOCl, based on the total weight, is preferably between about 2 to about 4 weight % in the wet film. The wet film can be established by using an applicator sold under the trade designation BIRD applicator by Paul N. Gardner Co. of Pompano Beach, Fla., on a black test card giving about 0.003 inch (0.008 cm) wet film thickness.

As used herein, "b" or "b-value" can indicate the color on a blue-yellow axis of a sample using the Hunter L, a, b system.

As used herein, a neat laser marking additive, such as high luster BiOCl, can include an organic additive introduced, i.e. intimately commingled with the high luster BiOCl during chemical formation, to a solution, e.g. an HCl solution, during the formation of the laser marking additive. Alternatively, a neat laser marking additive does not include any additive during chemical formation. A neat laser marking additive does not include other substances, such as an organic or inorganic additive, put in after the formation of the laser marking additive. As an example, a neat high luster BiOCl would include a BiOCl intimately commingled with an organic additive, but not if a wax, a surfactant or mica is subsequently added to the BiOCl after its formation.

The laser marking additive is desirably white or light or pale gray, suitable for being used as an additive for a laser-marking precursor. As used herein, "white" refers to a material having an L-value of greater than about 90 and "gray" refers to a material having an L-value of about 10 to about 90 using a Hunter L, a, b scale. Desirably, the laser marking additives shows both brightness and color neutrality. Brightness means that light is reflected rather than absorbed. Neutrality of color means that there is no selective absorption of light in the visible range, i.e. all wavelengths of light are absorbed or reflected equally. As an example, black, gray and white are all neutral in color.

Generally, the laser marking additives includes non-platelet particles having all dimensions less than 5 micron, preferably all particle dimensions less than 1 micron. For platelet particles, generally the thickness is less than 1 micron and all dimensions less than 25 microns, and preferably, the thickness is less than 100 nm and all dimensions less than 25 microns. The dimensions of the laser marking additives can be determined by a cross-sectional scanning electron micrograph, such as one sold under the trade designation TOPCON SM-520 of Paramus, N.J., and for platelet particles, by inference from the luster color and refractive index. Luster color can be measured by using a colorimeter sold under the trade designation HUNTER D25 M-9 calorimeter by Hunter Associates, of Reston Va. Drawdowns, i.e. dried thick films of lacquer containing platelet pigments, are shifted in orientation using a goniometer to get a new geometry of measurement which contains at least some of the specular [equal incident and observed angles] geometry, as an example 22.5° incident and 22.5° observed. At this angle the color of the reflected light is the luster color. BiOCl having a thickness less than 100 nm shows a nearly neutral reflection, which is indicative of a 60 nm thickness. Higher thickness can lead to yellow or red luster colorations. The refractive index of BiOCl can be found in published literature. As an example, a silver white interference effect is generated from a refractive index (r.i.) material of 2.15 at about 50-60 nm separation between the upper and lower surface, i.e. the interfaces of low r.i. (suspending medium) to high r.i. pigment and high r.i. to low (suspending medium) r.i. system over a temperature range, e.g., of 150° C.-300° C.

In addition, the laser marking additive can have a thermal decomposition temperature in air of less than about 400° C., preferably about 150-300° C., and optimally about 200° C. A thermal decomposition temperature is identifiable by a distinct darkening and discoloring as the temperature of the laser marking additives in air is increased by heating, as quantified by a colorimeter sold under the trade designation HUNTER D25 M-9 colorimeter by Hunter Associates of Reston Va. The colorimeter can have a circumferential 45° incident illumination and 0° observation, measuring L-value (brightness/darkness, where L increases with increasing brightness or reflection). The thermal decomposition temperature can occur where the L-value undergoes a distinct decrease, upon heating in air, from a maximum of at least 5, preferably 10, and optimally at least 20 L-value units at a 45 degree incidents degree observed angle using a Hunter L, a, b system over a temperature range, e.g., of 150° C.-300° C.

Generally, the laser marking additive includes arsenic, antimony, or bismuth, as discussed above. Preferably, the laser marking additive includes bismuth due to the non-toxicity of bismuth. With respect to the laser marking additive of bismuth, a preferred laser marking additive of bismuth can also include $BiONO_3$, $Bi_2O_2CO_3$, $BiOCl$, $BiOOH$, $BiOF$, $BiOBr$, $BiOC_3H_5O_7$, $Bi(C_7H_5O_2)_3$, $BiPO_4$, and $Bi_2(SO_4)_3$ and most preferably BiOCl, Alternatively, a laser marking additive can include lead carbonate of the formula $Pb(OH)_2 \cdot 2PbCO_3$ or $Pb(OH)_2 \cdot PbCO_3$.

A high luster bismuth oxychloride, when heated in air, can have a decrease from a maximum of at least about 20 in average L-value on a Hunter L, a, b scale in a temperature range of 150° C.-300° C. Generally, a high luster bismuth oxychloride can be in the form of a composite including bismuth oxychloride intimately commingled with at least one organic compound, as hereinafter described.

High luster bismuth oxychloride when well dispersed in a smooth and uniform lacquer film has a luster index of at least 50%. Luster index is defined as:

Luster index=$100\% * (L_{22.5°/22.5° over\ black} - L_{45°/0° over\ black})/L_{22.5°/22.5° over\ black}$ with the angles given as incident/observed using a Hunter L, a, b system. Furthermore, the high luster bismuth oxychloride can include platelets having a thickness as discussed above. Alternatively, a platelet-shaped high luster bismuth oxychloride can have a thickness of less than about 80 nm. A bismuth oxychloride having a thickness of less than 100 nm can be identified by observing in an optical microscope a four-fold symmetry axis, manifested either as perfect squares or squares with truncated corners sometimes approaching nearly octagonal. In addition, sometimes the edges can appear to be somewhat rounded. The average lateral dimension of such bismuth oxychloride crystals can generally be in the range of 8–25 microns, preferably 10–15 microns, which is consistent with an optimal pearlescent effect. Also, BiOCl can have a density of 7.7 g/cc.

For $BiONO_3$, $Bi_2O_2CO_3$, $BiOOH$, $BiOF$, $BiOBr$, $BiOC_3H_5O_7$, $Bi(C_7H_5O_2)_3$, $BiPO_4$, and $Bi_2(SO_4)_3$ particles, the dimensions of the particles generally are less than about 5 micron, preferably 2 micron, optimally 1 micron. In some cases platelet particles can be formed in a manner similar to BiOCl, and in those cases the preferred thickness is less 100 nm with all dimensions less than 25 microns.

Another additive of the present invention is a composite including an laser marking additive along with an organic compound, as discussed in further detail below. Desirably, the laser marking additive is intimately commingled with the organic compound by adding the organic compound to a solution during the formation of the laser marking additive. The organic compound, as discussed above, can be a fatty amine and/or amide, a cationic surfactant, an anionic surfactant, a nonionic surfactant, a silane, a siloxane, or a polymer. Suitable organic compounds are disclosed in DE 43 052 80 A1. Particularly, the organic additive, as partly discussed above, may include an ethoxylated fatty amine or amide, an ethoxylated fatty alkyl quaternary amine salt, an ethoxylated di-fatty alkyl quaternary amine, ethoxylated quaternary fatty salt, a sodium stearate, an ethoxylated sorbitol ester of a fatty acid, a fatty alcohol quaternary amine, a non-ethoxylated quaternary chloride salt, a mineral oil, a fatty ethoxylated aminopropylamine, an alkanolamide, a fatty trialkyl quaternary salt, a difatty dialkyl quaternary salt, a fatty amine, a fatty amine oxide, a fatty betaine, a fatty amidopropyl betaine, a fatty amphoteric, an N-fatty amino acid, and/or a fatty imidazoline. In addition, the organic compound or additive can be at least one anionic and/or nonionic fatty surfactant, such as a fatty ethoxylated carboxylate, a fatty carboxylate, a fatty carboxylic acid, a fatty ethoxylated phosphate, a di-fatty ethoxylated phosphate, a fatty ethoxylated sulfonate, a fatty ethoxylated sulfate, a fatty aryl sulfonate, a fatty ethoxylated carboxylate, a difatty carboxylate ethoxylate, a fatty glycol ester, and/or a fatty ethoxylated alcohol.

Preferably, the ethoxylated fatty amine is a compound of the formula:

$$R^1N(R^2)_2$$

where:
$R^1$ is an alkyl of 8–22 C atoms, and
$R^2$ is, independently, 1–25 units of —CH$_2$CH$_2$O— where the last unit terminates in a hydrogen atom;
the ethoxylated fatty amide is a compound of the formula:

$$R^1CON(R^2)_2$$

where:
$R^1$ is an alkyl of 8–22 C atoms, and
$R^2$ is, independently, 1–25 units of —CH$_2$CH$_2$O— where the last unit terminates in a hydrogen atom;
the ethoxylated fatty alkyl quaternary amine salt is a compound of the formula:

$$R^1N(R^2)_2R^{3+}Cl^-$$

where:
$R^1$ is an alkyl of 8–22 C atoms,
$R^2$ is, independently, 1–25 units of —CH$_2$CH$_2$O— where the last unit terminates in a hydrogen atom, and
$R^3$ is methyl, ethyl, propyl, or benzyl;
the ethoxylated quaternary fatty salt is a compound of the formula:

$$R^1NR^2R^3R^{4+}Cl^-$$

where:
$R^1$ includes any fatty acid hydrocarbon from 8–22 C atoms, and
$R^2$ and $R^3$ are, independently, 1–25 units of —CH$_2$CH$_2$O— where the last unit terminates in a hydrogen atom; and
$R^4$ is methyl, ethyl or propyl;
the non-ethoxylated quaternary chloride salt of the formula:

$$R^1N(R^3)_3{}^+Cl^-$$

where:
$R^1$ is an alkyl of 8–22 C atoms, and
$R^3$ is, independently, methyl, ethyl, propyl, or benzyl;
the fatty ethoxylated aminopropylamine is a compound of the formula:

$$R^1NR^2(CH_2)_3N(R^2)_2$$

where:
$R^1$ is an alkyl of 8–22 C atoms,
$R^2$ is, independently, 1–25 units of —CH$_2$CH$_2$O— where the last unit terminates in a hydrogen atom,
the alkanolamide is a compound of the formula:

$$R^1CON(CH_2CH_2OH)_2$$

where:
$R^1$ is an alkyl of 8–22 C atoms;

the fatty trialkyl quaternary salt is a compound of the formula:

$$R^1N(R^3)_3{}^+Cl^-$$

where:
$R^1$ is an alkyl of 8–22 C atoms,
$R^3$ is, independently, methyl, ethyl, propyl or benzyl;
the difatty dialkyl quaternary salt is a compound of the formula:

$$(R^1)_2N(R^3)_2{}^+Cl^-$$

where:
$R^1$ is, independently, an alkyl of 8–22 C atoms,
$R^3$ is, independently, methyl, ethyl, propyl or benzyl;
the fatty amine is a compound of the formula:

$$R^1NH_2 \text{ or } R^1N(R^3)_2$$

where:
$R^1$ is an alkyl of 8–22 C atoms,
$R^3$ is, independently, methyl, ethyl, propyl or benzyl;
the fatty amine oxide is a compound of the formula:

$$R^1NO(R^3)_2$$

where:
$R^1$ is an alkyl of 8–22 C atoms,
$R^3$ is, independently, methyl, ethyl, propyl or benzyl;
the fatty betaine is a compound of the formula:

$$R^1N^+\!\!-\!\!(R^3)_2(CH_2COO^-)$$

where:
$R^1$ is an alkyl of 8–22 C atoms,
$R^3$ is, independently, methyl, ethyl, propyl or benzyl;
the fatty amidopropyl betaine is a compound of the formula:

$$R^1CONH(CH_2)_3N^+(R^3)_2(CH_2COO^-)$$

where:
$R^1$ is an alkyl of 8–22 C atoms,
$R^3$ is, independently, methyl, ethyl, propyl or benzyl;
the fatty amphoteric is a compound of the formula:

$$R^1CONHCH_2CH_2N(CH_2CH_2OH)(CH_2COO^-Na^+)$$

or $$R^1CONHCH_2CH_2N(CH_2CH_2COO^-Na^+)$$
$$(CH_2CH_2OCH_2CH_2COO^-Na^+)$$

or $$R^1CONHCH_2CH_2N(CH_2CH_2OH)(CH_2C(OH)$$
$$HCH_2SO_3{}^-Na^+)$$

or $$R^1CONHCH_2CH_2N(CH_2CH_2COO^-Na^+)$$
$$(CH_2CH_2OCH_2COO^-Na^+)$$

or $$R^1CONHCH_2CH_2N(CH_2CH_2OH)(CH_2CH_2COO^-$$
$$Na^+)$$

where:
$R^1$ is an alkyl of 8–22 C atoms;
the N-fatty amino acid is a compound of the formula:

$$R^1N(CH_2CH_2CH_2\,NH_2)(CH(COOH)$$
$$CH_2CH_2CONH_2)$$

or $$R^1NHCH_2CH_2COOH$$

or $$R^1N(CH_2CH_2COO^-Na^+)(CH_2CH_2COOH)$$

where:
$R^1$ is an alkyl of 8–22 C atoms; and/or
the fatty imidazoline is a compound of the formula:

$$R^1(NCH_2CH_2N)CH_2CH_2OH$$

where: $R^1$ is an alkyl of 8–22 C atoms.

Desirably, the fatty ethoxylated carboxylate is a compound of the formula:

$$R^1(OCH_2CH_2)_xOCH_2COO^-Na^+$$

where:
$R^1$ is an alkyl of 8–22 C atoms, and
x is from 1–25;
the fatty carboxylate is a compound of the formula:

$$R^1COO^-Na^+$$

where:
$R^1$ is an alkyl of 8–22 C atoms;
the fatty carboxylic acid is a compound of the formula:

$$R^1COOH$$

where:
$R^1$ is an alkyl of 8–22 C atoms;
the fatty ethoxylated phosphate is a compound of the formula:

$$R^1(OCH_2CH_2)_xOPO(OH)_2$$

where:
$R^1$ is an alkyl of 8–22 C atoms, and
x is from 1–25;
the di-fatty ethoxylated phosphate is a compound of the formula:

$$(R^1(OCH_2CH_2)_x)_2-OPO(OH)$$

where:
$R^1$ is an alkyl of 8–22 C atoms, and
x is from 1–25;
the fatty ethoxylated sulfonate is a compound of the formula:

$$R^1-(OCH_2CH_2)_x-SO_3^-Na^+$$

where:
$R^1$ is an alkyl of 8–22 C atoms, and
x is from 1–25;
the fatty ethoxylated sulfate is a compound of the formula:

$$R^1-(OCH_2CH_2)_x-OSO_3^-Na^+$$

where:
$R^1$ is an alkyl of 8–22 C atoms, and
x is from 1–25;
the fatty aryl sulfonate is a compound of the formula:

$$R^1-(C_6H_4)SO_3^-Na^+$$

where:
$R^1$ is an alkyl of 8–22 C atoms;
the fatty ethoxylated carboxylate is a compound of the formula:

$$R^1CO-(OCH_2CH_2)_x-OH$$

where:
$R^1$ is an alkyl of 8–22 C atoms, and
x is from 1–25;
the difatty carboxylate ethoxylate is a compound of the formula:

$$R^1CO-(OCH_2CH_2)_x-OCOR^1$$

where:
$R^1$ is, independently, an alkyl of 8–22 C atoms, and
x is from 1–25;
the fatty glycol ester is a compound of the formula:

$$R^1CO-OCH_2CH_2OH$$

where:
$R^1$ is an alkyl of 8–22 C atoms; and/or
the fatty ethoxylated alcohol is a compound of the formula:

$$R^1(OCH_2CH_2)_xOH$$

where:
$R^1$ is an alkyl of 8–22 C atoms, and
x is from 1–25.

Generally, the organic compound is present in the composite in an amount of less than 2%, 0.1%–2%, or 0.5%–1.0%, by weight with respect to the weight of the composite. Also, other substances may be present. As an example, high luster bismuth oxychloride can be 98% pure, with the remainder being a residual salt of an alkali nitrate, such as sodium nitrate, potassium nitrate and ammonium nitrate; an alkali chloride such as sodium chloride, potassium chloride, and/or ammonium chloride; one or more surfactants, such as an ethoxylated fatty amine or amide as discussed above; and/or one or more resins.

BiOCl can show both brightness and color neutrality. Both as bulk powder and when dispersed into a matrix of thermoplastic, ordinary BiOCl powder shows high brightness [high L-values] and color neutrality [nearly zero values of a and b, as discussed in further detail hereinafter] at ambient temperatures. A composite including both BiOCl and an organic compound shows the same color neutrality in both the bulk powder and when dispersed into a thermoplastic, however, the brightness is dependent upon the state of dispersion. An advantage of BiOCl as compared to colored laser-marking additives such as copper or iron oxide is that the high luster BiOCl imparts less color to the organic matrix, because BiOCl is nearly neutral white. This neutrality permits easy adjustment to the pigmented formulation. Optionally, the organic compound can be present in sufficient amounts to act as a carrier.

With respect to laser marking additives, particularly those of bismuth such as bismuth oxychloride, these additives can be prepared without a carrier (neat) or with a carrier. Such carriers can include organic solvents and/or fluids or solids. Suitable carriers for thermoplastics can be organic solids or fluids of generally high melting point, highly non-polar and hydrophobic. Such carriers can include mineral oil/petrolatum; vegetable oils such as fatty acids, e.g., castor oil; paraffin waxes; polyolefin waxes; low molecular weight polymers and co-polymers including block co-polymers; polyethylene glycol and polypropylene glycol waxes; plasticizers, including esters, in turn including fatty acid esters, organophosphates, phthalates, citrates, and trimellitates; fatty acid salts; and fatty alcohols. Carriers compatible with thermosetting plastics useful in the present invention can be alkyd resins, polyester resins, acrylic resins, plasticizers as mentioned above, vegetable and mineral oils as mentioned above, waxes as mentioned above, organic solvents of low to medium polarity including chlorinated hydrocarbons, glycol ethers, alcohols, ethers, esters, ketones, aromatics, mineral spirits including aromatic and aliphatic types. Carriers compatible with coatings can be cellulosic resins including nitrocellulose, the resins mentioned above and including water and solvent soluble and curing type resins such as radiation curable resins, including UV curable monomers and oligomers, plasticizers and solvents mentioned above, and polyols. One suitable mineral oil is sold under the trade designation VERSAGEL mineral oil manufactured by Penreco of Houston, Tex.

Generally, the bismuth laser marking additive, such as bismuth oxychloride, in the carrier can range from 15-90% by weight of the dispersion or dry preparation, preferably 50%-80%, by weight of the dispersion or dry preparation, optimally 60%-80% by weight of the dispersion or dry preparation.

The manufacture of laser marking additives, such as BiOCl, includes the precipitation of white- or light gray-colored platelet particles having all dimensions less than 25 microns and a thickness less than 100 nm (which generates a high specific surface area) and/or intimate commingling of organic additives, with the option of intentional pre-fragmentation by cavitational homogenization of a dispersion of an laser marking additive, e.g. in equipment such as rotor/stator mixer, a Gaulin homogenizer, or a homogenizer sold under the trade designation MICROFLUIDICS homogenizer by Microfluidics of Newton, Mass.

The laser-marking additives can be prepared by methods known to those of ordinary skill in the art. One laser marking additives, bismuth oxychloride, can be prepared by the following method. A solution of $BiCl_3$ in hydrochloric acid or $Bi(NO_3)_3$ in nitric acid and hydrochloric acid with a $Bi^{3+}$ molarity of 0.1–2.5 M may be prepared. Feeding the $Bi^{3+}$ solution at a controlled rate into a reactor vessel containing a solution of dilute hydrochloric acid and/or alkali chloride salt such as sodium chloride or potassium chloride initiates a reaction. Although not wanting to be bound by any given scientific theory, it is believed that the reaction proceeds by the following formula:

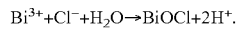

$$Bi^{3+}+Cl^-+H_2O \rightarrow BiOCl+2H^+.$$

During this reaction, the combined total chloride present in the reactor vessel as contributed from the feed solution and receiving solution must meet or exceed a mole ratio of 1 ml mole Cl per mole of Bi, as per the above formula. The above reaction proceeds immediately and quantitatively to completion. Optionally, a control feed of a solution of an alkali such as ammonium, sodium or potassium hydroxide can be provided to maintain and control a pH value throughout the delivery of the $Bi^{3+}$ solution. Generally, the pH should be controlled and maintained at values less than 3. A condition that may be desirable to achieve a high luster bismuth oxychloride is providing one or more organic additives, such as an ethoxylated fatty amine and/or amide, to the solution of dilute hydrochloric acid creating intimate commingling between the bismuth oxychloride and the organic additive.

At the end of the delivery of the $Bi^{3+}$ solution, excess acid, salts and organic additives in the mother liquor are removed from the precipitate by washing during filtration or by sedimentation and decanting followed by back-filling with deionized water. The bismuth oxychloride precipitate can then be dewatered by one more of the following mechanical means, such as sedimentation, filtration, or centrifugation. The water-wet paste may be subsequently oven-dried, followed by de-lumping via chopping, grating or sieving to render fines. Alternatively, the bismuth oxychloride can be jet-or spray-dried directly from slurry to render a dry powder or granulate. Spray drying can include introducing a powder suspension in water through a nozzle into a spray chamber by means of a pump. The atomized slurry spray is entrained into a stream of hot air, at approximately 250° C. The water droplets evaporate and the dry powder is carried out by the cooled exiting stream at slightly above 100° C. and then collected. Suspensions of high luster bismuth oxychloride in organic solvents and fluids are preferably prepared without proceeding to form a dry powder intermediate. Solvent and/or other organic fluid is added to the suspension in water followed by vacuum distillation to remove water.

Another method for preparing high luster bismuth oxychloride is disclosed in U.S. Pat. No. 5,149,369, hereby incorporated by reference.

High luster bismuth oxychloride is available under the trade designations NAILSYN and BI-FLAIR from EMD Chemicals, Inc. of Hawthorne, N.Y. and Merck KGaA of Darmstadt, Germany; BIJU (ULTRA) and MEARLITE INDUSTRIAL from Engelhard Corp., of Iselin, N.J.; and SUPERLITE, EXCELPEARL, and ULTIMAPEARL from Sun Chemical Corporation of Fort Lee, N.J.

Such suitable laser marking additives, such as high luster bismuth oxychloride, effective as an additive for laser-marking can be identified by having a thermal decomposition temperature of less than 400° C. and/or a decrease of at least about 20 from a maximum in average L value on a Hunter L, a, b scale in a temperature range of 150–300° C., upon heating in air.

In addition, the additives of the present invention can be combined with a wide variety of colorants, fillers, functional additives, e.g. dispersing agents, or conductive powders, or other additives that would provide comparable or superior sensitivity to laser-marking as compared to, for example, bismuth oxychloride alone. These other additives can include inorganic or organic materials, either as neat or composite particles.

The additive of the present invention can be incorporated into all sorts of thermoplastic materials used as, e.g., substrates. Particularly, all known thermoplastics, as described, for example, in Ullmann, Vol. 15, pp. 457 ff., published by VCH, can be used for laser-marking, except the thermoplastic is not an unsaturated polyester crosslinked with styrene. Examples of suitable plastics are discussed above. Particularly suitable are thermoplastic polyurethanes (TPUs) owing to their good mechanical properties and inexpensive processing methods. Thermoplastic polyurethanes have long been known from numerous patents and other publications, for example from GB 1,057,018 and EP 0 564,931.

Particularly, polyethylene or polypropylene is desirable, as discussed above. Suitable types of polyethylene include LDPE, LLDPE, ULDPE, VLDPE, HDPE, and UHMWPE. One particularly preferred polyethylene is HDPE with a density of 0.955 g/cc and a 7.9 melt index.

Generally, the laser marking additives, such as bismuth oxychloride, is dry mixed at room temperature with a suitable resin, such as polyethylene, before loading into the film or plastic. The laser marking additives can be combined with a resin, and dry mixed with a load shear mixer in order to maintain temperatures below the softening point of the resin. Generally, the mixing time is kept short to avoid heat build up from friction but sufficient to obtain a uniform distribution of the resin and laser marking additive to avoid major stratification or pockets.

If desired, an adhesive, an organic polymer-compatible solvent, a stabilizer and/or a surfactant can be added to the mix. As an example, a plastic granular and/or pigment mixture can be introduced into a suitable mixer, wetted with any additives, and then mixed with added bismuth oxychloride. Also, the pigmentation can be carried out via a color concentrate or a compound. The resultant mixture can then be processed directly in an extruder, and optionally subsequently fed to an injection-molding machine. Generally for testing purposes, the mixture can be fed directly into an injection-molding machine.

The mixing equipment and technique is generally dependent on the batch size and sheer required for compounding. Also, the speed and time requirements for mixing are dependent on the other materials, such as pigments and other additives, in the dry batch. As an example, mixers can range from 8–1000 liter or 250–1000 liter and can have two speeds, e.g. a low speed of 40 and a high speed of 3000 revolutions per minute (rpm). Suitable mixers include bag-shake mixers, continuous mixers, and drum-tumble mixers, as well as mixers sold by Welex of Blue Bell, Pa.; Hobart of Troy, Ohio; and Henschel of Kassel, Germany.

After mixing, the resultant mix can be extruded or molded at an elevated temperature. Generally, extrusion is undertaken at ambient atmospheric pressure and a temperature of 150–250° C., depending on the base substrate or resin. Within the heating chamber the non-resin components of the mix are folded nearly instantaneously into the molten thermoplastic, with nearly all of the air immediately forced back and released back into the feed hopper. Equipment options may include other vents to remove any residual trapped air. The non-resin components of the mixture experience very little or no exposure to air at elevated temperatures. The extrusion rate is dependent upon the screw size (diameter and length) of the extruder as well as the extruder's rpm and power. The extrusion rate is also dependent upon the materials being extruded. Any suitable type of extruder, such as single screw, or twin screw can be used to achieve the desired throughput. Exemplary throughput rates of 2.3 kg/hr–2300 kg/hr can be used. Generally a distribution of 100% is desired. After extrusion, the material is cooled for a set period of time, and then, is ready for laser-marking. Generally, a high luster bismuth oxychloride laser marking additive of the present invention, once distributed and extruded, renders only a very slight pearlescent effect because the platelets are highly fragmented by the action of the strong shear forces rendered by the extrusion and molding of the hot melt.

Once the precursor is formed by mixing and extruding, the precursor can be molded and subsequently exposed to laser radiation to create a laser-marked article. Generally, in a finished article, the loading of high luster bismuth oxychloride is as discussed above, or less than 1%, preferably less than 0.25%, or optimally at 0.1%, by weight. The basis of the loading weight percent is per 100% of the substrate or resin, such as polyethylene. Generally, higher loading yields a darker mark. Generally, laser-marking is carried out by introducing the precursor into the beam path of any suitable laser.

Generally, the laser can be a pulsed laser, a gas laser, or an excimer laser, as discussed above. An exemplary pulsed laser is a neodymium (3+)—doped yttrium aluminum garnet (Nd:YAG) laser either at 1064 nm or 532 nm wavelength at doubled frequency. One exemplary gas laser is a $CO_2$ laser, preferably having a 10,600 nm wavelength, and one exemplary excimer laser is a krypton fluoride laser having a 250 nm wavelength. A gas laser or an excimer laser can be used in conjunction with a mask technique. The output of a laser depends on the particular application and can be determined by an individual skilled in the art.

One optimal laser, the Nd:YAG laser, can be a diode-pumped solid-state laser, as discussed above. Its wavelength range is fixed to a narrow bandwidth by virtue of the discrete narrow distribution of energy states in the excited and ground state. Generally, the wavelength can be precisely as 1064 nm, but the frequency can be doubled to 532 run by use of a non-linear optical crystal. A Nd:YAG laser is sold under the trade designation LUMONICS LASERWRITER SPC from Gsi Lumonics of Farmington Hills, Mich. Generally, these lasers range from 33–37 amps in 1-amp steps and 2,000–8,000 pulses per second in two steps of 3,000 with a linear speed of 10 inches per second (25.4 cm/second). Preferably, the laser-marking occurs with a combination of 2,000 pulses per second and 33 amps at 25.4 cm/second. Generally, the markings are carried out at ambient atmospheric pressure and temperature. However, atmospheres other than air, such as oxygen, nitrogen, or a noble gas can be used.

Particularly, it is desirable to obtain a useful mark under a pulse Nd:YAG laser exposure at 1.06 micron with a minimum loading level below 1% when the additives are distributed and molded or extruded in a polyolefin, such as polyethylene. The present invention preferably provides a loading of 0.1–0.2% by weight which can be ten times more sensitive than that of conventional laser-marking additives. Also, it is desirable to use a laser-marking additive that is white and as a result imparts much less color to the organic matrix, as compared to other laser-marking additives that are yellow (some types of bismuth oxide) or grayish blue green (antimony oxide) or even darker and/or black color additives (copper compounds or black iron oxide). Thus it is desirable that the additive has minimal disturbance of color so that adjustment of the formulation can remain simple and easy.

The laser-marked article of the present invention can be used as or incorporated into a wide variety of products. These products can include moldings, cables, wires, trend strips, or functional parts in the heating, ventilation and cooling sectors of switches, plugs, levers or handles, foodstuffs' or toys' packaging, and animal tags.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

Example 1

This example measures the change in appearance of BiOCl powder as a function of temperature. When added at low concentrations to polymer resins, high luster bismuth oxychloride produces superior laser markability compared to non-high luster bismuth oxychloride powders. The high luster bismuth oxychloride produces a dark mark with good contrast to the neutral white background imparted to a polymer. The following demonstrates that changes in the high luster bismuth oxychloride produced by the laser beam can be related to temperature dependent behavior of high luster bismuth oxychloride, by itself. In the following tests, high luster BiOCl and non-high luster bismuth oxychloride powders by heating samples of the two types of powder at increasing temperatures in air and measuring the color of a powder button created using the heated material.

The sample of high luster bismuth oxychloride is prepared as a neat powder. The non-high luster bismuth oxychloride powder is obtained from lot of cosmetic grade. powder sold under the trade name Biron.

Each 25.00 gram portion of sample is heated in air using a labeled quartz crucible in a furnace sold under the trade designation THERMOLYNE 48000 furnace at a designated temperature for 90 minutes. The sample is cooled, then 20.00 grams of the cooled sample is transferred to a 6 cm diameter shallow tin and pressed to 1000 psi to create a powder button using a Kemwall Engineering PL-2108 button press. L,a,b, powder measurements of the button are then taken using a calorimeter sold under the trade designation HUNTERLAB TRISTIMULUS D25M-9 calorimeter. Two measurements are taken and averaged. One sample of each type of powder is also pressed and measured without heating (shown as 20° C. on the graphs) to illustrate any temperature dependent change from the unheated powder.

The procedure for the standardization of the HUNTERLAB TRISTIMULUS D25M-9 calorimeter is as follows. The procedure calibrates the colorimeter with standard tiles, traceable to NIST, provided by the manufacturer and covers the mechanism for establishing the correct voltage to the lamp in order to establish the correct brightness and ratio of yellow/blue illumination. Generally, the following standardization checks are performed: 1) the standardization with NIST traceable black and white tiles, and 2) the standardization check with NIST traceable colored tiles.

Standardization is conducted by performing the following steps beginning with turning the OPERATE/STBY switch (at rear of processor) to the operate (up) position, and afterwards, "READY" will be displayed. Next, waiting a minimum of 30 minutes for the lamp to stabilize is required. After warm up, the black platform is secured to the sensor port by means of its built-in clips. Afterwards, the stability of the platform is checked. That being done, the tiles are inspected to ensure that they are clean and free of major scratches.

To begin the zero scale calibration, the shiny side of the black standardization glass tile is placed up against the black platform. Next, "ZERO" is pressed and the "ZERO STORED" will be displayed.

To begin standardization of the white standard tile, the calibrated white standard tile is placed up against the specimen port. Next, "RECALL INST. STD 0" is pressed. This action brings up the white standard tile reading, which must match the values on the back of the white tile. Next "STDZ", "READ" and "XYZ" is pressed. The XYZ values of the instrument's white standard tile are displayed. The measured values from the white tile are compared to the standard values. After referring to the tolerances section, if the values are not within the tolerance specified, the standardization starting at the Zero Scale Calibration is repeated.

To begin the standardization check with colored standard tiles, each colored tile is placed up against the specimen port, "READ" is pressed and then "XYZ" is pressed. The measured values from the standardizations are compared to the standard values. If the values are not within the control limits ranges, zero scale calibration and standardization of the white standard tile is completed again, and then the readings of the colored tiles is repeated.

The tolerances for the standard white is depicted in Table 1 below:

TABLE 1

| Inst. Serial No. | Standard No. | Calibrated Values | | | |
| --- | --- | --- | --- | --- | --- |
| | | X | V | Z | Tolerance |
| 10284 | C2-23039 | 81.40 | 83.45 | 98.40 | +0.3 |
| 9116 | C2-12292 | 85.54 | 83.25 | 100.09 | +0.7 |

With respect to the colored tiles, their tolerances are within the upper and lower control limits of factory-read values.

The following preventative maintenance can be undertaken. The standard tiles are generally cleaned at least monthly with a solution sold under the trade designation SPARKLEEN solution in an amount of 1 tablespoon per gallon water. The tiles are scrubbed with a soft nylon brush. Afterwards, the tiles are rinsed with hot water, and dried with a clean, nonoptically brightened, lint-free paper towel, but not a wiper sold under the trade designation KIMWIPE wiper or the equivalent.

To replace the lamp, the OPERATE/STBY switch is switched to STBY. Afterwards, the bulb is wiped with isopropyl alcohol on a soft towel just before putting in place. Next, the sticker with the labeled operating lamp voltage is placed in the reserved space on the optical sensor nameplate. Afterwards, the OPERATE/STBY switch is switched to OPERATE, and the bulb warms up for at least 30 minutes. That being done, the labeled voltage is adjusted using a voltmeter and a voltage adjustment knob in the back of the HUNTER processor. Next, the blue standard tile is placed up against the specimen port and the XYZ button is pressed. The voltage is adjusted until the Y value reads the same as the factory-read value (±0.3). Afterwards, the yellow tile is placed up against the specimen port and the same procedure is followed as with the blue standard tile. The tiles are alternated until both tiles' Y values read the same as their factory-read values (±0.3). That being done, the Hunter, and the color standards are checked for XYZ values, which should read within tolerances, as noted above.

The generated data is depicted in the following table.

TABLE 2

| | temp °C. | L (avg) | b (avg) | L1 | b1 | L2 | b2 |
| --- | --- | --- | --- | --- | --- | --- | --- |
| High Luster BiOCl in air | 20 | 81.91 | 0.65 | 81.91 | 0.65 | 81.91 | 0.64 |
| | 100 | 82.93 | 0.55 | 83.00 | 0.51 | 82.85 | 0.58 |
| | 150 | 82.15 | 1.45 | 82.30 | 1.40 | 81.99 | 1.49 |
| | 200 | 75.67 | 6.83 | 75.55 | 6.88 | 75.79 | 6.78 |
| | 250 | 67.41 | 5.57 | 67.38 | 5.56 | 67.43 | 5.58 |
| | 300 | 59.99 | 2.79 | 59.99 | 2.78 | 59.98 | 2.79 |
| | 400 | 59.94 | 0.09 | 59.95 | 0.09 | 59.93 | 0.09 |
| Non-High Luster BiOCl in air | 20 | 96.14 | 1.29 | 96.19 | 1.27 | 96.08 | 1.30 |
| | 100 | 96.30 | 1.13 | 96.34 | 1.11 | 96.26 | 1.14 |
| | 200 | 96.81 | 1.07 | 96.79 | 1.07 | 96.83 | 1.07 |
| | 250 | 96.69 | 1.10 | 96.71 | 1.09 | 96.67 | 1.10 |
| | 300 | 96.57 | 0.88 | 96.54 | 0.88 | 96.60 | 0.88 |
| | 400 | 97.13 | 0.99 | 97.17 | 0.98 | 97.09 | 0.99 |

Referring to FIG. 1, the average $L_{45°/0°}$ value versus temperature shows very little change for the non-high luster powder as the heating temperature increases. The high luster bismuth oxychloride sample also shows small increase (about 1) in $L_{45°/0°}$ upon heating to 100° C., and minimal change between 100 and 150° C. The high luster sample, however, shows a drop in $L_{45°/0°}$ value by (about 6.5) between 150° C. and 200° C. The sample shows a further drop of about 8.25 between 200 and 250° C., and a further drop of about 7.4 between 250° C. and 300° C. The curve plateaus at about $L_{45°/0°}$ at just under 60.00, beginning at 300° C. and continuing through 400° C. The total change in $L_{45°/0°}$ from unheated sample to sample heated at 400° C. is a decrease of about 22 due to heating. This is 23 numbers lower than the highest $L_{45°/0}$ at 100° C. Consequently, the L-value undergoes a distinct shift of 20 L-value units in the temperature range of 150 to 300° C. In contrast, the curve for the non-high luster bismuth oxychloride maintains nearly the same L-value up to 400° C.

Figure 2:
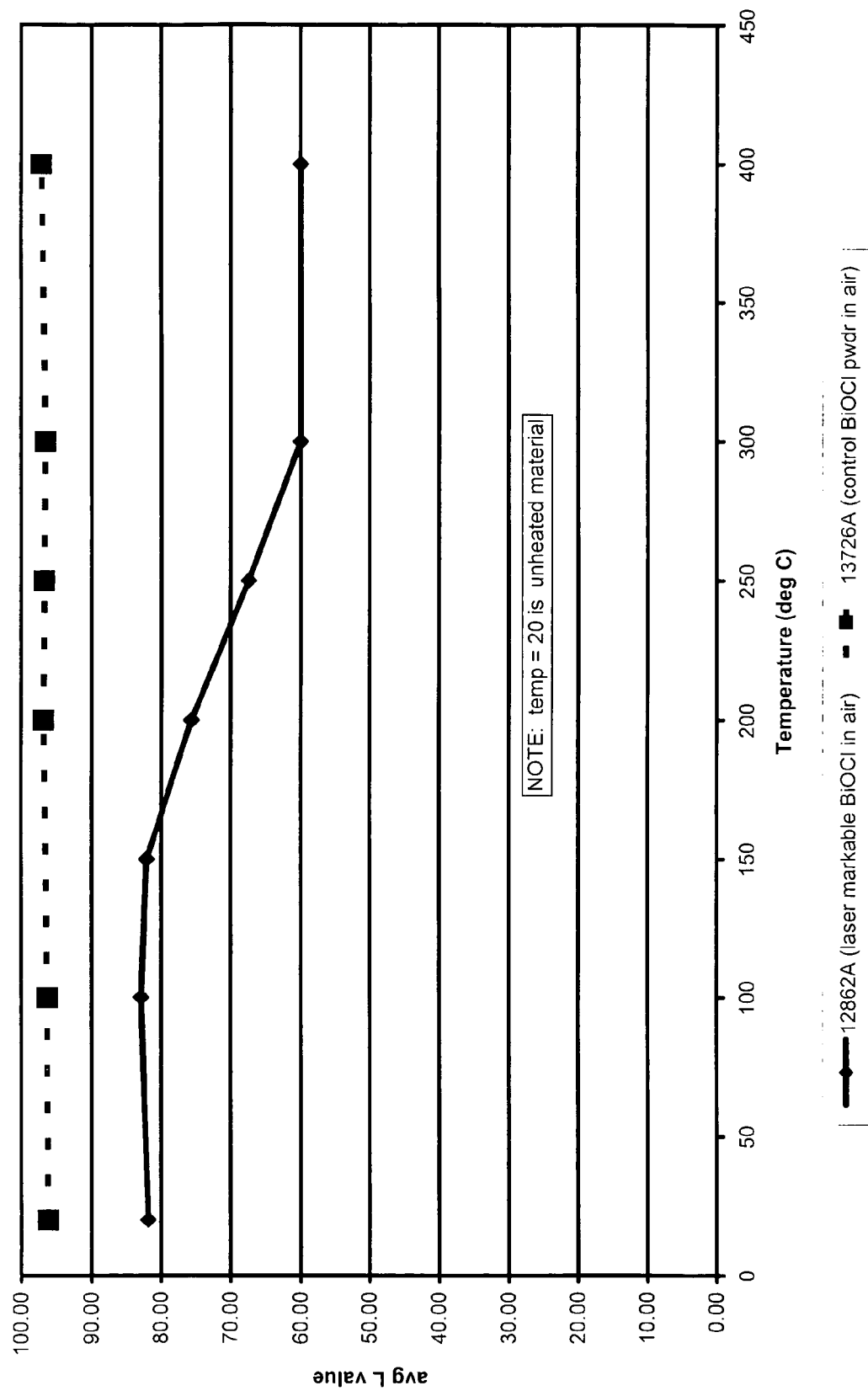
FIG. 2 is a graphical depiction of a high luster BiOCl additive and a comparison non-high luster BiOCl additive plotting 'b' value versus temperature in degree Celsius.

Referring to FIG. 2, the average 'b' (>0 yellow/<0 blue color) change versus temperature is depicted. This graph provides further clarification of the continued visual change in powder color demonstrated by the high luster BiOCl. The high luster sample changes from a near neutral (very slight yellow of about 0.65) in the unheated powder and the 100° C. sample, increasing slightly to about +1.45 b value for 150° C. sample. The yellowness continues to increase to a maximum b value of about +6.8 at 200° C. The yellow (b) value then decreases from this value as the temperature increases. The similar L45°/0° value measured for both the 300° C. and 400° C. sample is differentiated by a decrease in b value from +2.78 at 300° C. to a very neutral L-value of 0.09 at 400° C. The high luster BiOCl color shifts from a brownish shade at 300° C. to a notable very dark gray at 400° C. The non-high luster sample did not display much change in L45°/0° over the temperature range tested, nor was there a definitive change in yellowness ('b' value). The L45°/0° and the b value for the non-high luster powder remained within about 0.4 from uncalcined until 400° C. (L from 96.69 to 97.13 and b value from about +1.28 to +0.99), maintaining the level of whiteness found in non-high luster powder. Furthermore, with respect to the high luster BiOCl, the b value (measuring yellowness/blueness, b increases with increasing yellowness) undergoes a peak shift in yellowness reaching a maximum of 7 b-value units in the same temperature range. The yellow coloration is consistent with the formation of $Bi_2O_3$ that is bright yellow. Although not wanting to be bound by any scientific theory, plausible reduction and $Bi_2O_3$ formation reactions can be written as one reaction:

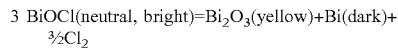
$$3\ BiOCl(neutral, bright) = Bi_2O_3(yellow) + Bi(dark) + \tfrac{3}{2}Cl_2$$

Alternatively, although again not wanting to be bound by any scientific theory, the darkening of high luster BiOCl when heated above 250° C. in air can also be attributed to thermal decomposition and/or oxidation of residual surfactants such as the fatty amine ethoxylate.

Example 2

Masterbatches are prepared by loading about 10 to 50% high luster bismuth oxychloride into a polyethylene blend of HDPE and LDPE. One masterbatch contains high luster bismuth oxychloride in the form of neat bismuth oxychloride, i.e. being greater than 98% by weight bismuth oxychloride, and the other masterbatch contains a dispersion mixture of 68-72% by weight bismuth oxychloride and a mineral oil (sold under the trade designation VERSAGEL mineral oil manufactured by Penreco of Houston, Tex.) of 28-32% by weight. These masterbatches can subsequently be mixed with additional resin and optionally other pigments, fillers and additives via additional blow molding or injection molding to form samples with loadings varying from 0.1-1% of BiOCl in HDPE. Some of the HDPE samples ranging from 0.1 to 1% loading are formed into an article, such as a blow molded bottle. Other samples from the master batch are prepared by diluting out the concentrate to a level of 0.1% to 1% loading, by injection molding into chips (stepped plates).

Exposing both the bottles and the plastic chips to a Nd:YAG laser resulted in a commercially viable a laser-mark.

Example 3

A sample of neat (i.e. carrier-free) high luster bismuth oxychloride is prepared by spray-drying a suspension of water-washed high luster bismuth oxychloride optionally followed by comminution by chopping in a table-top blender. These four samples are compared to five powders sold under the trade designation BIRON, commercially available from EMD Chemicals, Inc. and their parent company Merck KGaA. The loading is in weight percent and HDPE without any additives, fillers, or colorant. The molded plastic chips are directly compounded by mixing additive powders with resin powders and injection molding without first forming an extruded concentrate. The subsequent molded chips (stepped plate chips) are exposed to a laser under identical conditions. The laser is a laser sold under the trade designation LUMONICS LASERWRITER SPC, a Nd:YAG laser employing a grid of two-fold combinations of decreasing power (current is controlled) ranging from 33–37 amps in 1-amp steps and increasing pulse frequencies ranging from 2,000–8,000 pulses per second in two steps of 3,000, with a linear speed of 10 inches (25.4 cm) per second. The marks are in all cases dark, as opposed to white.

TABLE 3

| | | | Mark Contrast/Sensitivity | |
|---|---|---|---|---|
| PIGMENT | TYPE | LOADING | V. LS820 OR LS825 AT 0.25% | VS. NEAT RESIN |
| Biron B50-173 | powder | 1% | much poorer/much weaker | better/stronger |
| Biron B50 | powder | 1% | much poorer/much weaker | better/stronger |
| Biron LF 2000 | powder | 1% | much poorer/much weaker | better/stronger |
| Biron MTU | powder | 1% | much poorer/much weaker | better/stronger |
| Biron Fines | powder | 1% | much poorer/much weaker | better/stronger |

TABLE 3-continued

| PIGMENT | TYPE | LOADING | Mark Contrast/Sensitivity V. LS820 OR LS825 AT 0.25% | VS. NEAT RESIN |
|---|---|---|---|---|
| Example 1 | high luster | 1% | higher/stronger | much better/much stronger |
| Example 1 | high luster | 0.5% | slightly higher/slightly stronger | much better/much stronger |
| Example 1 | high luster | 0.25% | very slightly higher/comparable | much better/much stronger |
| Example 1 | high luster | 0.1% | much poorer/much weaker | better/stronger |

The data in Table 3 demonstrates that in equal loading levels high luster bismuth oxychloride is comparable to LASER FLAIR LS820 and LASER FLAIR LS825, commercially available marking particles of mica flakes coated with antimony-doped tin oxide, in sensitivity and slightly superior in contrast of laser-marking. Although non-high luster bismuth oxychloride renders some enhancement of sensitivity to laser-marking, high luster bismuth oxychloride even at one quarter of the level of non-high luster bismuth oxychloride is by far superior in sensitivity and contrast.

Example 4

Various samples of powder are prepared by treating a neat non-high luster bismuth oxychloride sold under the trade designation of BIRON FINES by EMD Chemicals, Inc. of Hawthorne, N.Y., by suspending the powder in hot deionized water and adding an organic additive at 1% by weight of a base powder. The treated powder is then filtered without washing and drying in an oven followed by sieving. The following organic compounds or additives are employed:

TABLE 4

| Example 2a | [α] | ethoxylated fatty amine |
| Example 2b | [β] | ethoxylated fatty alkyl guaternary amine |
| Example 2c | [χ] | ethoxylated di-fatty alkyl guaternary amine |
| Example 2d | [δ] | sodium stearate |

TABLE 4-continued

| Biron NLD | [ε] | ethoxylated sorbitol ester of fatty acid |
| Bentone 27V | [φ] | fatty alkyl quaternary amine. |

A non-high luster, non-neat bismuth oxychloride sold under the trade designation BIRON NLD available from EMD Chemicals, Inc. and their parent company Merck KGaA is treated with 1–2% of organic additive. Another powder that contains no bismuth oxychloride and is sold under the trade designation BENTONE 27V by Elementis Specialties, Inc. of Hightstown, N.J., and is composed of treated hectorite clay intimately commingled with an organic additive. All samples are tested under substantially identical conditions. The molded plastic chips are directly compounded by mixing additive powders with HDPE resin powder and submitting the resultant mixture to injection molding without first forming an extruded concentrate. Loading is in weight percent in HDPE without any other additives, fillers or colorants. The laser exposures are performed using a laser sold under the trade designation LUMONICS LASERWRITER SPC, a Nd:YAG laser employing a grid of two-fold combinations of decreasing power (current is controlled) ranging from 33–37 amps in one-amp steps and an increasing pulse frequencies ranging from 2,000–8,000 pulses per second in two steps of 3,000, with a linear speed of 10 inches (25.4 cm) per second. The marks observed in all cases are dark, as opposed to white.

TABLE 5

| PIGMENT | TYPE OF ORGANIC ADDITIVE | LOADING | Mark Contrast/Sensitivity vs. EXAMPLE 1 AT 0.25% | vs. Neat Resin |
|---|---|---|---|---|
| Biron Fines | none | 1% | much poorer/much weaker | better/stronger |
| Example 2a | [α] | 1% | much poorer/much weaker | better/stronger |
| Example 2b | [β] | 1% | much poorer/much weaker | better/stronger |
| Example 2c | [χ] | 1% | much poorer/much weaker | better/stronger |
| Example 2d | [δ] | 1% | much poorer/much weaker | better/stronger |
| BIRON NLD | [ε] | 1% | much poorer/much weaker | better/stronger |
| BENTONE 27V | [φ] | 1% | much poorer/much weaker | comparable/comparable |

| PIGMENT | ADDITIVE | LOADING | MARK CONTRAST/SENSITIVITY VS. BIRON FINES AT 1% |
|---|---|---|---|
| BIRON FINES | none | 1% | —/— |
| Example 2a | [α] | 1% | very slightly better/very slightly stronger |
| Example 2b | [β] | 1% | comparable/comparable |

TABLE 5-continued

| | | | |
|---|---|---|---|
| Example 2c | [χ] | 1% | very slightly poorer/very slightly weaker |
| Example 2d | [δ] | 1% | slightly poorer/slightly weaker |
| BIRON NLD | [ε] | 1% | very slightly poorer/very slightly weaker |
| BENTONE 27V | [φ] | 1% | much poorer/much weaker |

The above data in Table 5 demonstrates that retroactive treatment of powder bismuth oxychloride with a variety of different organic additives, i.e. adding the organic additive after the formation of the BiOCl, provides only a weak influence with respect to laser-marking sensitivity and contrast. It appears that ethoxylated fatty amine only provides a slight enhancement compared to untreated bismuth oxychloride powder. It is therefore insufficient to take retroactively treated non-high luster bismuth oxychloride powder to achieve an enhancement in laser-marking sensitivity. In the case of the samples treated with sodium stearate and BIRON NLD, the different treatments have been independently demonstrated to result in better dispersion by virtue of an enhanced pearlescent effect. Therefore the above tests appear to demonstrate that better dispersion by itself is insufficient to render enhanced laser-marking sensitivity from bismuth oxychloride. Furthermore, the very poor sensitivity of laser-marking rendered by hectorite clay treated with a fatty alkyl quaternary amine demonstrates that a powder containing a non-bismuth oxychloride substrate intimately commingled with organic additives does not achieve the same laser marking contrast/sensitivity as a high luster bismuth oxychloride. Therefore it is not sufficient to take an ordinary inorganic metal salt and retroactively treat with surfactant. Consequently, this demonstrates the significant and unexpected results of incorporating high luster bismuth oxychloride into a thermoplastic, to obtain a significant and unexpected quality of a laser-mark. Not wanting to be bound by any scientific theory, it appears that the higher laser-marking sensitivity is due to the high state of distribution, the very thin platelets (about 60 nm thick) of bismuth oxychloride, and the intimate commingling of a residual organic additive.

Example 5

Four samples are prepared of a cosmetic grade neat non-high luster bismuth oxychloride powder having a luster index <50% sold under the trade designation Biron ESQ and manufactured by EMD Chemicals, Inc. of Savannah, Ga. The four samples are treated by a combination of sheer mixing with or without treatment of an ethoxylated fatty amine surfactant. The ethoxylated fatty amine surfactant is of the formula $R^1N(R^2)_2$ where: $R^1$ is an alkyl of 8–22 C atoms, and $R^2$ is, independently, 1–25 units of —$CH_2CH_2O$— where the last unit terminates in a hydrogen atom. Water suspensions of approximately 50% non-high luster bismuth oxychloride are submitted to high sheer mixing using rotor/stator impeller heads, supplied by Kady International, a Kinetic Dispersion Company of Scarborough, Me. After mixing for either 3 or 12 minutes in attempt to ensure nearly complete comminution without inducing agglomeration, the suspension is optionally mixed with a fatty amine ethoxylate surfactant at a ratio of 1% per weight of bismuth oxychloride. Microscopic examination indicates that the original particles are extremely comminuted and dispersed. Four samples are spray-dried, and extruded with polyethylene at a loading of 0.5% by weight of the total weight into an injection-molder. These four samples are depicted below:

TABLE 6

| COMMINUTION DURATION | ADDITIVE 1% ETHOXYLATED FATTY AMINE | MARKING CONTRAST/SENSITIVITY: VS. NEAT HIGH LUSTER BISMUTH OXYCHLORIDE PREPARED UNDER THE SAME CONDITIONS | MARKING CONTRAST/SENSITIVITY VS. POLYETHYLENE CONTAINING NO ADDITIVES |
|---|---|---|---|
| 3 minutes | none | much poorer/much weaker | better/stronger |
| 12 minutes | none | much poorer/much weaker | better/stronger |
| 3 minutes | Added after grinding | much poorer/much weaker | better/stronger |
| 12 minutes | Added after grinding | much poorer/much weaker | better/stronger |

Compared to high luster bismuth oxychloride extruded and injected molded under the same conditions, the laser marking performance in sensitivity and contrast/definition are much poorer, but more sensitive than polyethylene containing no additives. As exemplified, the laser marking sensitivity of a powder-type bismuth oxychloride is not increased by comminution (i.e., fragmentation in the lateral aspect). Although not wanting to be bound by any scientific theory, intimate commingling of the organic component in the formation of a high luster bismuth oxychloride is desirable to achieve a thin platelet thickness and a commercially interesting laser marking sensitivity. However, extruding a non-high luster BiOCl, with the prerequisite comminution of the BiOCl powder and optionally a surfactant treatment, does not appear to significantly improve laser marking sensitivity to the level of a high luster BiOCl.

Example 6

A water suspension of neat high luster BiOCl is admixed with an emulsion of a polyolefin wax sold under the trade designation Jonwax 39 by Johnson Polymer of Racine, Wis. at a ratio of 2.5–5% by weight dry wax to the sum of all dry components including the BiOCl, Also, the same original water suspension of neat high luster BiOCl is admixed with wet-ground muscovite mica platelets having a particle size of less than 15 microns. These two suspensions are each spray-dried to yield a dry powder containing high luster BiOCl and the carrier/diluent, and then the powder is extruded with polyethylene and subsequently injected molded. Nine samples are depicted in the Table below:

TABLE 7

| CARRIER COMPONENT | WT. % PER TOTAL DRY WEIGHT OF MIXTURE | MARKING CONTRAST/SENSITIVITY: VS. NEAT HIGH LUSTER BISMUTH OXYCHLORIDE PREPARED UNDER THE SAME CONDITIONS | MARKING CONTRAST/SENSITIVITY vs. POLYETHYLENE CONTAINING NO ADDITIVES |
|---|---|---|---|
| Mica | 10 | very slightly poorer/very slightly weaker | better/stronger |
| Mica | 20 | very slightly poorer/very slightly weaker | better/stronger |
| Mica | 25 | very slightly poorer/very slightly weaker | better/stronger |
| Mica | 30 | slightly poorer/slightly weaker | better/stronger |
| Mica | 40 | poorer/weaker | better/stronger |
| Mica | 50 | poorer/weaker | better/stronger |
| Mica | 75 | poorer/weaker | better/stronger |
| Jonwax 39 residue | 2.5 | very slightly poorer/very slightly weaker | better/stronger |
| Jonwax 39 residue | 5.0 | very slightly poorer/very slightly weaker | better/stronger |

In both cases, negligible losses in performance are observed by the admixture of low concentrations of carrier/diluents. Thus, the above carrier/diluent/particle substrates, below a maximum concentration of about 25%, apparently have virtually no or significant adverse effect on the performance of a high luster bismuth oxychloride as a laser marking sensitizer.

The entire disclosure of all applications, patents and publications, cited herein is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A laser marking additive, comprising:
a plurality of particles having a thickness less than 100 nm and all dimensions less than 25 microns of at least one compound of the formula:

MOCl where M is, independently, As, Sb, or Bi; or
a compound of formula $BiONO_3$, $Bi_2O_2CO_3$, BiOOH, BiOF, BiOBr, $BiOC_3H_5O_7$, $Bi(C_7H_5O_2)_3$, $BiPO_4$, $Bi_2(SO_4)_3$, $Pb(OH)_2 \cdot 2PbCO_3$, or $Pb(OH)_2 \cdot PbCo_3$; wherein a lacquer drawdown comprising the additive has a luster index of greater than 50%.

2. A laser marking additive according to claim 1 wherein the particles have all dimensions less that 5 microns.

3. A laser marking additive according to claim 1, wherein the additive is a high luster bismuth oxychloride.

4. A laser marking additive according to claim 1, further comprising a fatty amine, a fatty amide, an organic cationic surfactant, an organic anionic surfactant; an organic nonionic surfactant; an organic silane; an organic siloxane; or an organic polymer.

5. A laser marking additive according to claim 3, further comprising a fatty amine, a fatty amide, an organic cationic surfactant, an organic ionic surfactant; an organic nonionic surfactant; an organic silane; an organic siloxane; or an organic polymer.

6. A laser marking additive according to claim 1, further comprising an ethoxylated fatty amine or amide, an ethoxylated fatty alkyl quaternary amine, an ethoxylated di-fatty alkyl quaternary amine, a sodium stearate, an ethoxylated sorbitol ester of a fatty acid, a fatty alcohol quaternary amine, or a mineral oil.

7. A laser marking additive according to claim 3, further comprising an ethoxylated fatty amine or amide, an ethoxylated fatty alkyl quaternary amine, an ethoxylated di-fatty alkyl quaternary amine, a sodium stearate, an ethoxylated sorbitol ester of a fatty acid, a fatty alcohol quaternary amine, or a mineral oil.

8. A laser marking additive according to claim 6, wherein the ethoxylated fatty amine is a compound of the formula:

$R^1NR^2R^3$ where:
$R^1$ includes any fatty acid hydrocarbon from 8–22 C atoms, and
$R^2$ and $R^3$ are, independently, 1–25 units of $-CH_2CH_2O-$ where the last unit terminates in a hydrogen atom;
the ethoxylated fatty amide is a compound of the formula:

$R^1CONR^2R^3$ where:
$R^1$ includes any fatty acid hydrocarbon from 8–22 C atoms, and
$R^2$ and $R^3$ are, independently, 1–25 units of $-CH_2CH_2O-$ where the last unit terminates in a hydrogen atom; or further comprising
a non-ethoxylated quaternary chloride salt of the formula:

$R^1NR^3_3{}^+Cl^-$ where:
$R^1$ includes any fatty acid hydrocarbon from 8–22 C atoms, and
$R^4$ is, independently, methyl, ethyl or propyl.

9. A laser marking additive according to claim 7, wherein the ethoxylated fatty amine is a compound of the formula:

$R^1NR^2R^3$ where:
R$^1$ includes any fatty acid hydrocarbon from 8–22 C atoms, and
R$^2$ and R$^3$ are, independently, 1–25 units of —CH$_2$CH$_2$O— where the last unit terminates in a hydrogen atom;
the ethoxylated fatty amide is a compound of the formula:

$R^1CONR^2R^3$ where:
R$^1$ includes any fatty acid hydrocarbon from 8–22 C atoms, and
R$^2$ and R$^3$ are, independently, 1–25 units of —CH$_2$CH$_2$O— where the last unit terminates in a hydrogen atom; or further comprising
a non-ethoxylated quaternary chloride salt of the formula:

$R^1NR^3_3{}^+Cl^-$ where:
R$^1$ includes any fatty acid hydrocarbon from 8–22 C atoms, and
R$^4$ is, independently, methyl, ethyl or propyl.

10. A laser-markable precursor, comprising a substrate of a polyolefin, a polyamide, a polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, an acrylonitrile-styrene-acrylate, a polycarbonate, a polyether sulphone, a polyether ketone, a copolymer thereof, or a mixture thereof, with the proviso that the substrate is not an unsaturated polyester cross-linked with a styrene monomer, and a laser marking additive according to claim 1.

11. A laser-markable precursor, comprising a substrate of a polyolefin, a polyamide, a saturated polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, an acrylonitrile-styrene-acrylate, a polycarbonate, a polyether sulphone, a polyether ketone, a copolymer thereof, or a mixture thereof, and a laser marking additive according to claim 1.

12. A laser-markable precursor, comprising a substrate of a polyolefin, a polyamide, a polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, an acrylonitrile-styrene-acrylate, a polycarbonate, a polyether sulphone, a polyether ketone, a copolymer thereof, or a mixture thereof, with the proviso that the substrate is not an unsaturated polyester cross-linked with a styrene monomer, and a laser marking additive according to claim 3.

13. A laser-markable precursor, comprising a substrate of a polyolefin, a polyamide, a saturated polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, an acrylonitrile-styrene-acrylate, a polycarbonate, a polyether sulphone, a polyether ketone, a copolymer thereof, or a mixture thereof, and a laser marking additive according to claim 3.

14. A laser-markable precursor, comprising a pigmented substrate which is a polyolefin, a polyamide, a polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, an acrylonitrile-styrene-acrylate, a polycarbonate, a polyether sulphone, a polyether ketone, a copolymer thereof, or a mixture thereof, with the proviso that the substrate is not an unsaturated polyester cross-linked with a styrene monomer, and wherein the pigment comprises a high luster bismuth oxychloride.

15. A laser-markable precursor, comprising a substrate of a polyolefin, a polyamide, a saturated polyester, a polyester ester, a polyether ester, a polyphenylene ether, a polyacetal, a polybutylene terephthalate, a thermoplastic polyurethane, a polymethyl methacrylate, a polyvinyl acetal, a polystyrene, an acrylonitrile-butadiene-styrene, an acrylonitrile-styrene-acrylate, a polycarbonate, a polyether sulphone, a polyether ketone, a copolymer thereof, or a mixture thereof, and a high luster bismuth oxychloride.

16. A method of laser-marking comprising exposing a precursor according to claim 10 to a laser creating a laser-mark.

17. A method of laser-marking comprising exposing a precursor according to claim 11 to a laser creating a laser-mark.

18. A method of laser-marking comprising exposing a precursor according to claim 12 to a laser creating a laser-mark.

19. A method of laser-marking comprising exposing a precursor according to claim 13 to a laser creating a laser-mark.

20. A method of laser-marking comprising exposing a precursor according to claim 14 to a laser creating a laser-mark.

21. A method of laser-marking comprising exposing a precursor according to claim 15 to a laser creating a laser-mark.

22. A method according to claim 16, wherein the laser is a pulsed laser, a gas laser, or an excimer laser.

23. A method according to claim 20, wherein the laser is a pulsed laser, a gas laser, or an excimer laser.

24. A method according to claim 22, wherein the laser is a Nd:YAG laser.

25. A method according to claim 23, wherein the laser is a Nd:YAG laser.

26. A laser-markable precursor according to claim 14, wherein the substrate is a polyethylene or polypropylene.

27. A laser-markable precursor according to claim 14, wherein the substrate is a high density polyethylene.

28. A laser-marking additive according to claim 3, wherein the high luster bismuth oxychloride comprises platelets having a thickness of no more than 90 nm.

29. A laser-marking additive according to claim 3, wherein the high luster bismuth oxychloride comprises platelets having a thickness of no more than 70 nm.

30. A laser-marking additive according to claim 3, wherein the high luster bismuth of about 60 nm. oxychloride comprises platelets having a thickness of about 60 nm.

31. A laser-markable precursor according to claim 12, wherein the loading of the high luster bismuth oxychloride in the substrate less than 5%.

32. A laser-markable precursor according to claim 12, wherein the loading of the high luster bismuth oxychloride in the substrate is less than 0.3%.

33. A laser-markable precursor according to claim 12, wherein the loading of the high luster bismuth oxychloride in the substrate is 0.1–0.25%.

34. A laser-markable precursor according to claim 1, wherein the additive has a thermal decomposition temperature in air of less that about 400° C.

35. A laser-marking additive according to claim 1, wherein the additive has a thermal decomposition temperature in air of 150°–300° C.

* * * * *